United States Patent
Bohlinger et al.

(10) Patent No.: US 10,712,757 B2
(45) Date of Patent: *Jul. 14, 2020

(54) PROCESS CONTROLLER WITH AN INTEGRATED OPTICAL DETECTOR

(71) Applicant: WATLOW ELECTRIC MANUFACTURING COMPANY, St. Louis, MO (US)

(72) Inventors: William Bohlinger, Buffalo City, WI (US); John P. Bergen, San Jose, CA (US); Stanton Hopkins-Breitlow, Winona, MN (US); James Hentges, Fountain City, WI (US); Jason Houzenga, Onalaska, WI (US); Gil Ramos, Richmond, IL (US); Kurt Peterson, Winona, MN (US); Larry Walters, Winona, MN (US); Daryl G. James, Coquitlam (CA)

(73) Assignee: Watlow Electric Manufacturing Company, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/465,075

(22) Filed: Mar. 21, 2017

(65) Prior Publication Data
US 2017/0192443 A1    Jul. 6, 2017

Related U.S. Application Data

(63) Continuation of application No. 14/254,229, filed on Apr. 16, 2014, now Pat. No. 9,625,923.
(Continued)

(51) Int. Cl.
*G05B 11/01* (2006.01)
*G05D 23/19* (2006.01)
*G05D 23/27* (2006.01)

(52) U.S. Cl.
CPC ..... *G05D 23/1931* (2013.01); *G05D 23/1934* (2013.01); *G05D 23/27* (2013.01)

(58) Field of Classification Search
CPC .................................................. G05D 23/1934
(Continued)

(56) References Cited

U.S. PATENT DOCUMENTS 4,891,970 A * 1/1990 Remboski, Jr. ........... G01J 1/04
374/144
4,969,082 A * 11/1990 Oho ......................... H04Q 9/00
340/3.1
(Continued)

FOREIGN PATENT DOCUMENTS

CN 1632485 6/2005
CN 201425525 3/2010
(Continued)

OTHER PUBLICATIONS

Bae, K-Y., T-H. Lee, and K-C. Ahn. "An optical sensing system for seam tracking and weld pool control in gas metal arc welding of steel pipe." Journal of Materials Processing Technology 120.1 (2002): pp. 458-465.*
(Continued)

*Primary Examiner* — Satish Rampuria
(74) *Attorney, Agent, or Firm* — Burris Law, PLLC

(57) ABSTRACT

A process controller is provided and includes at least one optical sensor. The optical sensor includes an optical source is configured to emit an electronic signal toward an object. The process controller further includes a control unit in communication with the at least one optical sensor, wherein the control unit controls a controlled device based on the electronic signal received by the at least one optical sensor. In another form, the optical sensor further includes an optical detector configured to receive the return electronic
(Continued)

signal reflected by the object. A system for process control in an elevated radio frequency (RF) environment is also provided and includes a process controller having at least one optical sensor and a control unit in communication with the optical sensor. The optical sensor is disposed within the elevated RF environment and includes an optical detector.

16 Claims, 7 Drawing Sheets

Related U.S. Application Data

(60) Provisional application No. 61/812,625, filed on Apr. 16, 2013.

(58) Field of Classification Search
USPC .................................................. 700/8–22
See application file for complete search history.

(56) References Cited

U.S. PATENT DOCUMENTS

| | | | |
|---|---|---|---|
| 5,659,133 A | 8/1997 | Sims et al. | |
| 6,430,472 B1* | 8/2002 | Boillot | G05B 19/056 219/121.61 |
| 6,712,133 B1* | 3/2004 | Kyrtsos | B60H 1/00735 165/239 |
| 7,087,075 B2* | 8/2006 | Briscoe | A61F 7/02 607/104 |
| 7,430,451 B2* | 9/2008 | Muneta | G05B 19/058 700/21 |
| 7,529,644 B2* | 5/2009 | Lenz | G01K 1/024 340/3.1 |
| 7,539,599 B2* | 5/2009 | Hasegawa | G03G 15/55 700/10 |
| 7,813,816 B2* | 10/2010 | Fulton | G05B 19/054 700/11 |
| 8,805,549 B2* | 8/2014 | Lill | G01D 21/00 340/870.02 |
| 2002/0177908 A1* | 11/2002 | Bhat | G02B 6/3586 700/12 |
| 2003/0014199 A1* | 1/2003 | Toomey | G01H 9/002 702/56 |
| 2004/0122559 A1* | 6/2004 | Young | B01L 7/52 700/269 |
| 2006/0052905 A1* | 3/2006 | Pfingsten | H01R 9/2425 700/286 |
| 2006/0170904 A1 | 8/2006 | Kuczynski et al. | |
| 2008/0128588 A1 | 6/2008 | Okamoto | |
| 2009/0177328 A1* | 7/2009 | Finley | H02K 15/165 700/275 |

FOREIGN PATENT DOCUMENTS

| | | |
|---|---|---|
| CN | 102072777 | 5/2011 |
| DE | 4341773 | 3/1995 |
| FR | 1589852 | 4/1970 |
| JP | S59176637 | 10/1984 |
| JP | 05107120 | 4/1993 |
| JP | 05333945 | 12/1993 |
| JP | 2009294180 | 12/2009 |

OTHER PUBLICATIONS

Konuk, A. R., et al. "Process control of stainless steel laser welding using an optical spectroscopic sensor." Physics Procedia 12 (2011): pp. 744-751.*

Giallorenzi, Thomas G., et al. "Optical fiber sensor technology." IEEE transactions on microwave theory and techniques 30.4 (1982): pp. 472-511.*

Ohodnicki, Paul R. "A review and perspective: Thin films for optical based chemical sensing at extreme temperatures." 2012 Future of Instrumentation International Workshop (FIIW) Proceedings. IEEE, 2012.pp. 1-4 (Year: 2012).*

Riza, Nabeel Agha, Muzamil Arain, and Frank Perez. "Harsh environments minimally invasive optical sensing technique for extreme temperatures: 1000 degrees C and approaching 2500 degrees C." 17th International Conference on Optical Fibre Sensors. vol. 5855. 2005. pp. 687-690 (Year: 2005).*

Mihailov, Stephen J. "Fiber Bragg grating sensors for harsh environments." Sensors 12.2 (2012): pp. 1898-1918. (Year: 2012).*

* cited by examiner

PROCESS CONTROLLER WITH AN INTEGRATED OPTICAL DETECTOR

CROSS-REFERENCE TO RELATED APPLICATIONS

This application is a continuation application of U.S. Ser. No. 14/254,229, filed Apr. 16, 2014, which claims priority to and the benefit of U.S. provisional application Ser. No. 61/812,625, filed on Apr. 16, 2013, the contents of which are incorporated herein by reference in their entirety.

FIELD

The disclosure relates generally to process controllers and optical sensing.

BACKGROUND

The statements in this section merely provide background information related to the present disclosure and may not constitute prior art.

Many industrial processes require process control systems that can provide accurate and repeatable temperature control in extremely high voltage environments. Traditional electrical sensors that are commonly applied to measure process variables are not well suited to high voltage environments because they are adversely affected by electromagnetic interference from the high voltage.

SUMMARY

In one form, a process controller is provided that comprises at least one optical sensor, wherein the at least one optical sensor includes an optical detector operable to receive an electronic signal, and a control unit in communication with the at least one optical sensor, wherein the control unit controls a controlled device based on the electronic signal received by the at least one optical sensor.

In another form, a process controller is provided that includes at least one optical sensor, wherein the at least one optical sensor includes an optical source and an optical detector, the optical source IS configured to emit an electronic signal toward an object and the optical detector IS configured to receive a return electronic signal reflected by the object. The process controller further comprises a control unit arranged with and in communication with the at least one optical sensor, wherein the control unit determines a condition of the object based on the return electronic signal from the at least one optical sensor and controls a controlled device based on the determined condition.

In yet another form, a system for process control in an elevated radio frequency (RF) environment is provided. The system includes a process controller comprising at least one optical sensor and a control unit in communication with the at least one optical sensor. The at least one optical sensor is disposed within the elevated RF environment and includes an optical detector configured to receive a return electronic signal reflected by the object. The control unit interprets the return electronic signal to determine a condition and controls a controlled device based on the determined condition.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
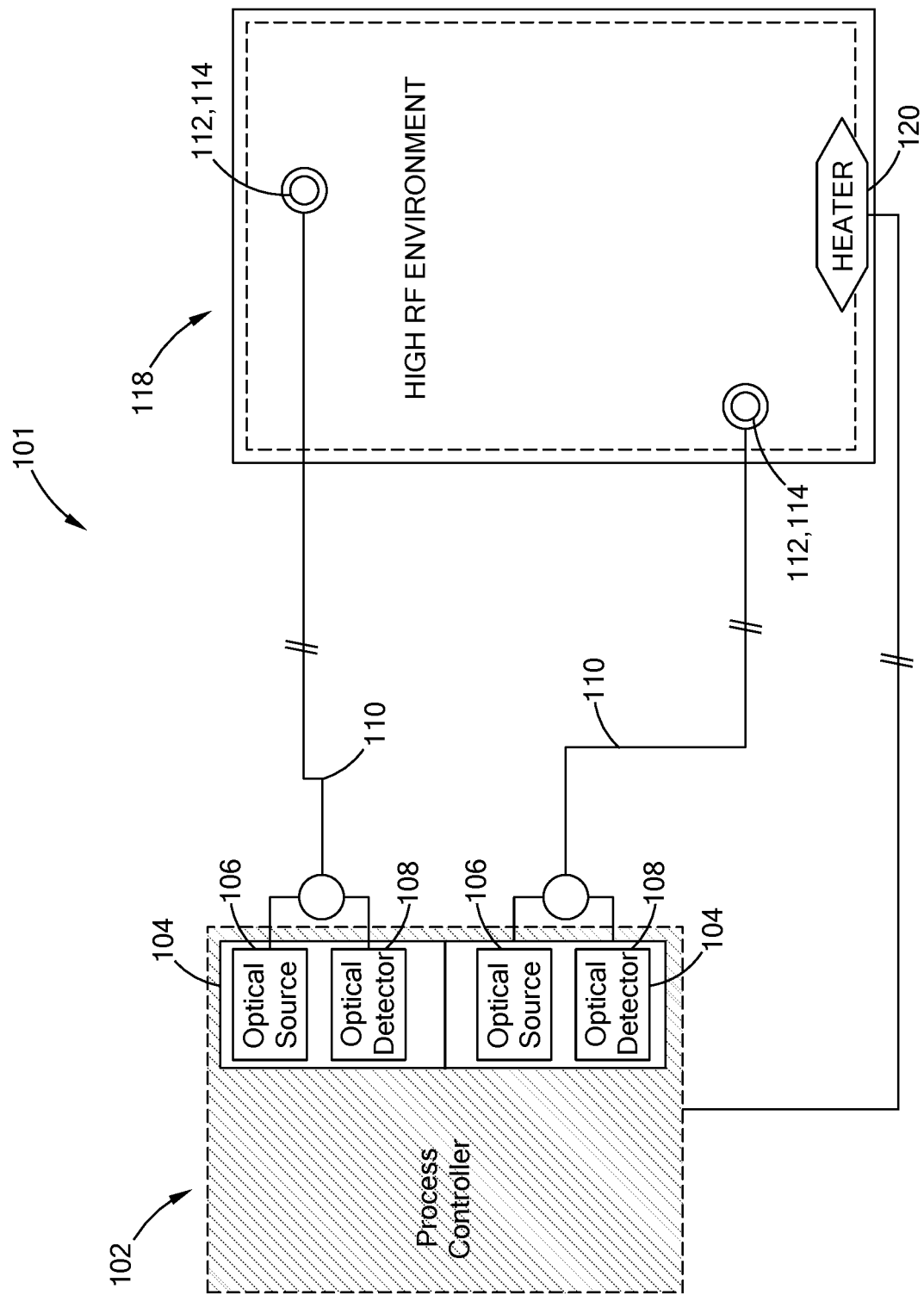
FIG. 1 is a block diagram of a process controller with integrated controls for optical temperature sensors in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a block diagram of a system 101 for process control with integrated controls for optical sensors, such as by way of example optical temperature sensors, is shown. The system 101 generally comprises a controller 102, which includes a plurality of optical sensors 104. Each optical sensor 104 comprises an optical source 106 and an optical detector 108. In this example, each optical sensor 104 is connected by a fiber optic cable 110 to an optical probe 112 to detect the temperature of a first zone 114 and a second zone 116 of a heated chamber 118. This implementation may provide for an integrated system 101 capable of measuring temperature signals from each of the optical probes 112 and controlling the temperature of the heated chamber 118 through a variety of closed-loop process control methods, including a proportional, integral, and derivative (PID) control.

The system 101 may be especially beneficial for measuring temperatures in environments having elevated radio frequency (RF) activity. Some environments may comprise processes that require extremely high voltages, such as by way of example, plasma enhanced chemical and physical reactions, high voltage transformers, high field strength medical devices, industrial heaters, electronics, motors, and other high voltage equipment generating elevated RF levels.

These environments adversely affect the operation of conventional electrical measurement devices due to electromagnetic (EM) interference produced by nearby, high-field components, wires, and sensors (electrically conducted). Conventional controllers rely on electrical connections that may not be capable of accurately measuring temperatures due to RF interference. The disclosed controller 102 may provide for accurate and repeatable measurement and control of various processes that require measurements of environmental factors in the high-field environments due to the integration of optical sensors. The integration of optical sensors 104 may further provide for the integration of high level information from the optical sensors that may not otherwise be possible.

Unlike conventional electrical temperature measurement devices, the optical sensors 104 are not affected by the electric or magnetic fields as set forth above. This system 101 may provide for continuous temperature measurement where it would otherwise not be possible with other systems. By routing light through a fiber optic cable 110, the temperature signal can be established in the actual environment because the fiber optic cable is not electrically conductive.

To measure the temperature of each optical probe 112, the optical sensors may apply pulses of light from each optical source 106 (e.g. pumping light or LED) through the fiber optic cables 110. The light from the pulses then travels down the fiber optic cable 110 to the optical probe 112. The optical probe 112 may comprise a temperature sensitive material, such as a gel or crystal, that absorbs and reflects the light from the pulses based on its temperature. The light is then absorbed and re-emitted through the fiber optic cable to the optical detector 108, where a returned light profile is interpreted by the controller. This interpretation is accomplished through algorithms, which may widely vary depending on the application and controller design. One skilled in the art can readily appreciate and understand the specifics of such algorithms for their application without going into the details herein.

The electrical signal from the optical detector 108 may comprise a variety of digital or analog signals depending on the specific operation of the detector. The temperature may then be applied to determine the temperature at each of the temperature zones 114, 116 and applied to control the temperature of a heater 120, or a process, device, or object.

Figure 2:
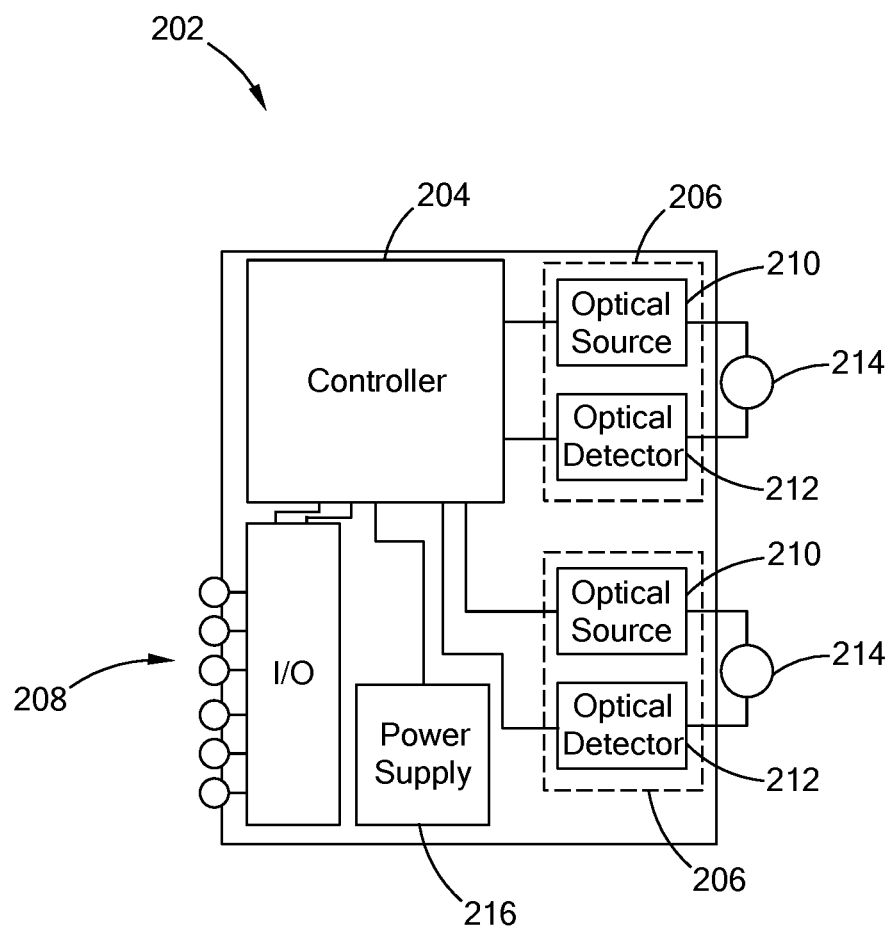
FIG. 2 is a block diagram of a process controller with integrated controls for optical sensors in accordance with the teachings of the present disclosure.

Referring to FIG. 2, a block diagram of a process controller 202 with integrated optical sensing is shown in accordance with the present disclosure. The process controller 202 may be applied to integrate optical sensing as an input for temperature control in a highly elevated radio frequency (RF) environment. The process controller 202 generally comprises a controller 204, a plurality of optical sensors 206, and a plurality of communications circuits (I/O) 208 for control of various processes. As described in reference to FIG. 1, each optical sensor may comprise an optical source 210 and an optical detector 212. Each of the optical sensors 206 may further comprise a cable interface 214 configured to be connected to a fiber-optic cable. The controller 202 may be similar to that disclosed in U.S. Pat. No. 7,636,615 titled "Power Control System," which is commonly owned with the present application and the contents of which are incorporated herein by reference in their entirety.

The optical sensors 206 may be implemented to supply and detect electronic temperature signals in the environment to avoid the adverse effects associated with high-intensity EM fields. The optical sensors 206 may be implemented to measure a variety of temperature related processes, and in some implementations, may further be applied to measure pressure and strain, or gas concentrations, among other conditions such as corrosion by way of example, by implementing related optical devices. By integrating the optical sensors 206 into the environment, the process controller 202 provides improved optical sensing through improved monitoring of a variety of optical signals that may be measured by the optical sensors 206. For example, the improved sensing may include a streamlined data path, sample rate, improved speed versus accuracy, and managed reliability. Improved monitoring thus results in improved process control due to additional process information that may be recorded through the integrated optical sensors 206.

The controller 204 may generally comprise a processing device and in some instances may comprise a micro-controller or a plurality of processors integrated through a variety of circuits. The controller 204 may be configured to control and sample temperature signals from the optical sensors 206. As the controller 204 samples the optical sensor 206 measurements, in this case the temperature measurements, the measurements may be stored in memory that may be incorporated in the controller 204. The temperature measurements may then be applied to calculate and adjust at least one output passed through the I/O circuitry 208. The at least one output may then be transmitted to a heater or any other system being controlled (controlled system) as a process control input.

In an exemplary implementation, the temperature measurements may be interpreted over time through a PID control method. The PID control method may calculate an error from the temperature measurements compared to a target temperature in the controlled system. The error may be monitored proportionally based on the present error, integrally based on the accumulation of past errors, and derivatively to predict future errors. In this implementation, the process may be configured to monitor the temperature measurements and calculate the error from the target temperature for a plurality of optical sensors 206. Upon calculating the error, the controller may output one or more control signals to the controlled system to correct the error while continuing to monitor the temperature measurements and calculating future control signals.

The process controller 202 may further be configured to communicate the control performance, measurement data, and statistical information to a reporting server. Reporting functionality may provide additional benefits of applying the process controller 202. By reporting information about one or more controlled systems, the performance of the controller may be monitored. Faults in a specific process or operation may be provided to supervisory or safety systems through the I/O circuitry 208. Such safety systems may be implemented to prevent improper operation of the controlled system.

In some cases, a combination of optical sensors and electrical measurement sources may be supplied as inputs to the controller 202. The number of measurement sources, electrical and optical, may be adjusted through modular circuit design. The process controller may provide for a broad range of control applications, each requiring diverse processing and communications requirements. The specific sampling rate by the controller of the data from the optical sensors 206 may also vary widely depending on the process being monitored and controlled. Memory as discussed herein may comprise random access memory (RAM), volatile memory, non-volatile memory, static memory, dynamic memory, flash memory, and/or any device that stores digital information.

The I/O circuitry 208 discussed herein may comprise a plurality of communication standards. The controller may monitor, control, and report process operation through a variety of methods, some examples of which may include: RS-232 or RS-485 transceivers, serial communication (FPGA, ASIC), CANbus, Modbus, CIP, CC-Link and BACnet, local bus, PCI, Ethernet, wireless 802.1(a, b, g, n), EtherCAT, Device Net, Bluetooth, and/or DALI, or other known and future communication standards. It should be understood that these communications protocols are merely exemplary and should not be construed as limiting the scope of the present disclosure.

Figure 3:
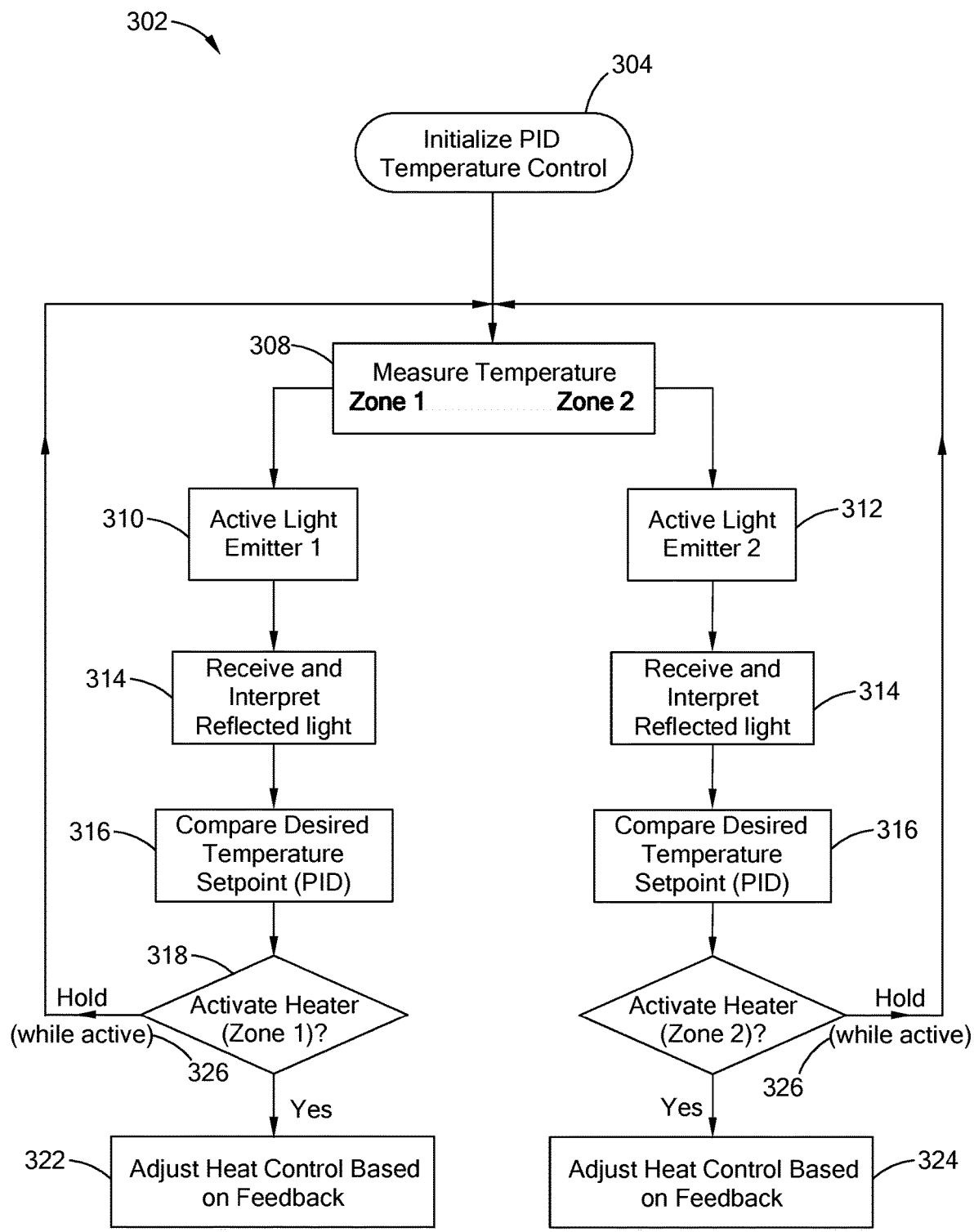
FIG. 3 is a flow chart of a method of PID control implemented by a process controller with integrated controls for optical sensors in accordance with the teachings of the present disclosure.

Referring to FIG. 3, a flow chart of a method 302 of PID control implemented by a process controller is shown in accordance with the disclosure. Upon initialization of PID control 304, a process controller similar to that introduced in FIG. 2 may be implemented to measure and control the temperature of an environment having elevated RF activity. In this implementation, the process controller is applied to measure the temperature of two independently heated zones 308. In response to the initialization of PID control, each optical sensor 310, 312 may be activated to send pulses of light through a cable interface. Through the cable interfaces, the controller may be connected to fiber-optic cables through which the pulses of light may travel and reflect or be re-emitted back from each optical probe. The reflected pulses may then be interpreted 314 for each zone to provide the temperature of each zone.

With the temperature data, the process controller may calculate the error in the measured temperature compared to the set-point or desired temperature 316. In response to a temperature error, a first 318 and a second 320 heat control output from the process controller may be adjusted for the first zone 322 and the second zone 324 to offset the temperature error independently for the first zone 322 and the second zone 324. While the PID temperature control is active 326, the method may continue to measure the temperature of each zone 308 through each optical sensor. By integrating the capability to implement optical sensors, the controller provides for an integrated process controller that may safely and accurately control the temperature of a process in highly elevated radio frequency (RF) environments, in addition to monitoring and acting on other process/environment information as set forth above. In other forms, additional circuits may be employed in the controller to receive input from devices other than an optical sensor, including by way of example, thermocouples, RTDs, and thermistors.

Figure 4:
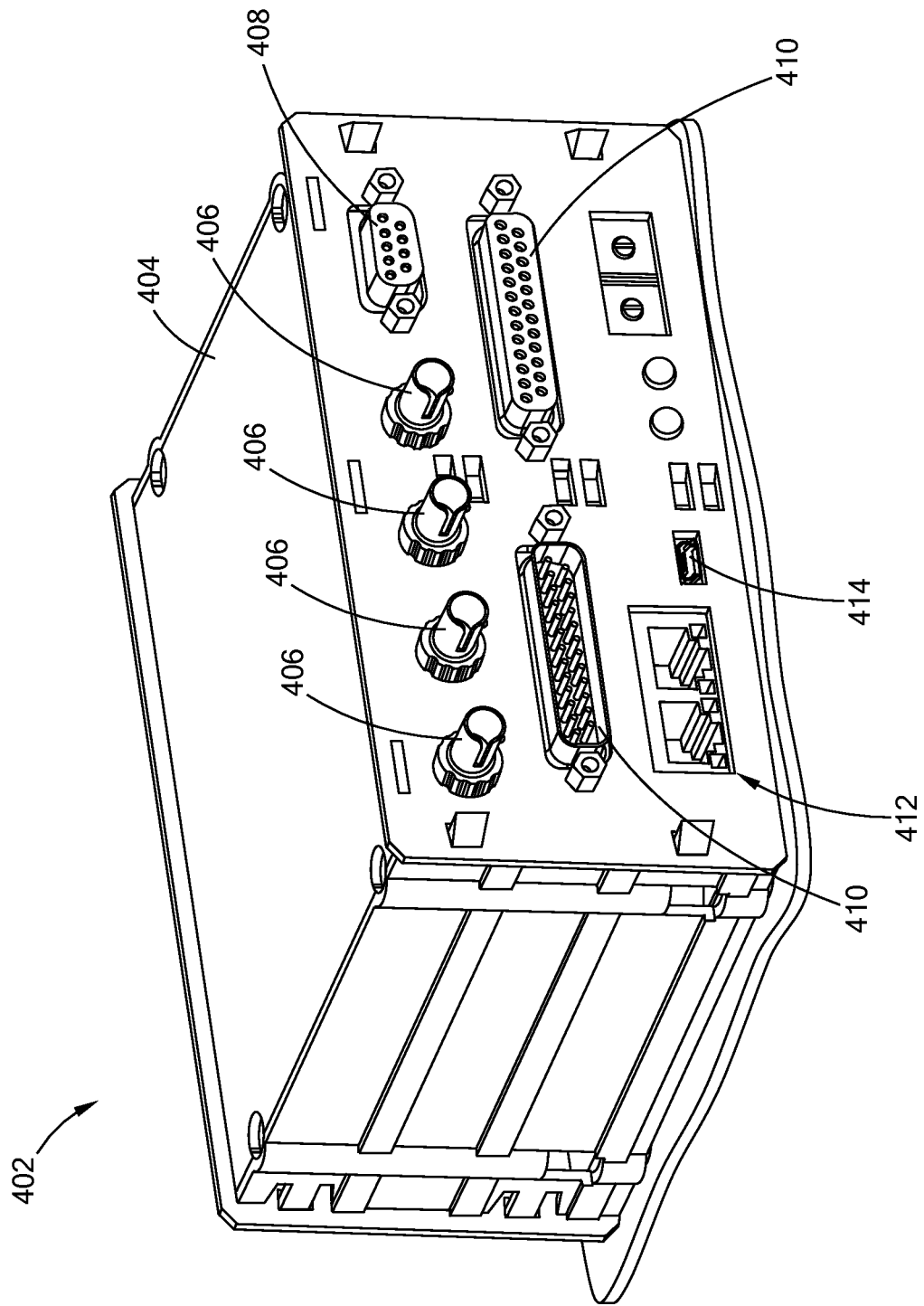
FIG. 4 is a perspective view of an enclosed process controller with integrated controls for optical sensors constructed in accordance with the teachings of the present disclosure.

Referring to FIG. 4, a perspective view of an enclosed process controller 402 with integrated optical sensing is shown in accordance with the one form of the present disclosure. The mechanical enclosure 404 may house one or more printed circuit cards with typical circuits and electrical components. Some examples of electrical components housed in the mechanical enclosure 404 may comprise an electronic temperature controller configured for temperature sensing and heater operation control, and communication I/O modules or circuitry for communication with other electronic entities within a controlled system. In this implementation, the process controller 402 comprises a plurality of optical sensors 406 integrated into the process controller. The optical sensors 406 may be applied to communicate through fiber optic cable to measure the temperature of four temperature zones.

The process controller may further comprise a plurality of ports including a serial communication port 408, a plurality of parallel ports 410, an Ethernet port 412, and a USB port 414. The I/O ports may be applied to communicate instructions from the process controller 402 to a plurality of controlled devices or systems. The various communication ports may further provide for reporting system performance, measurement data, and statistical information to a reporting server. By reporting information related to the operation of one or more of the controlled systems, the performance of the systems and the controller 402 may be monitored. Also, faults in specific processes or operations may be detected by the controller 402 and reported to supervisory or safety systems that may be implemented to prevent improper operation.

Figure 5:
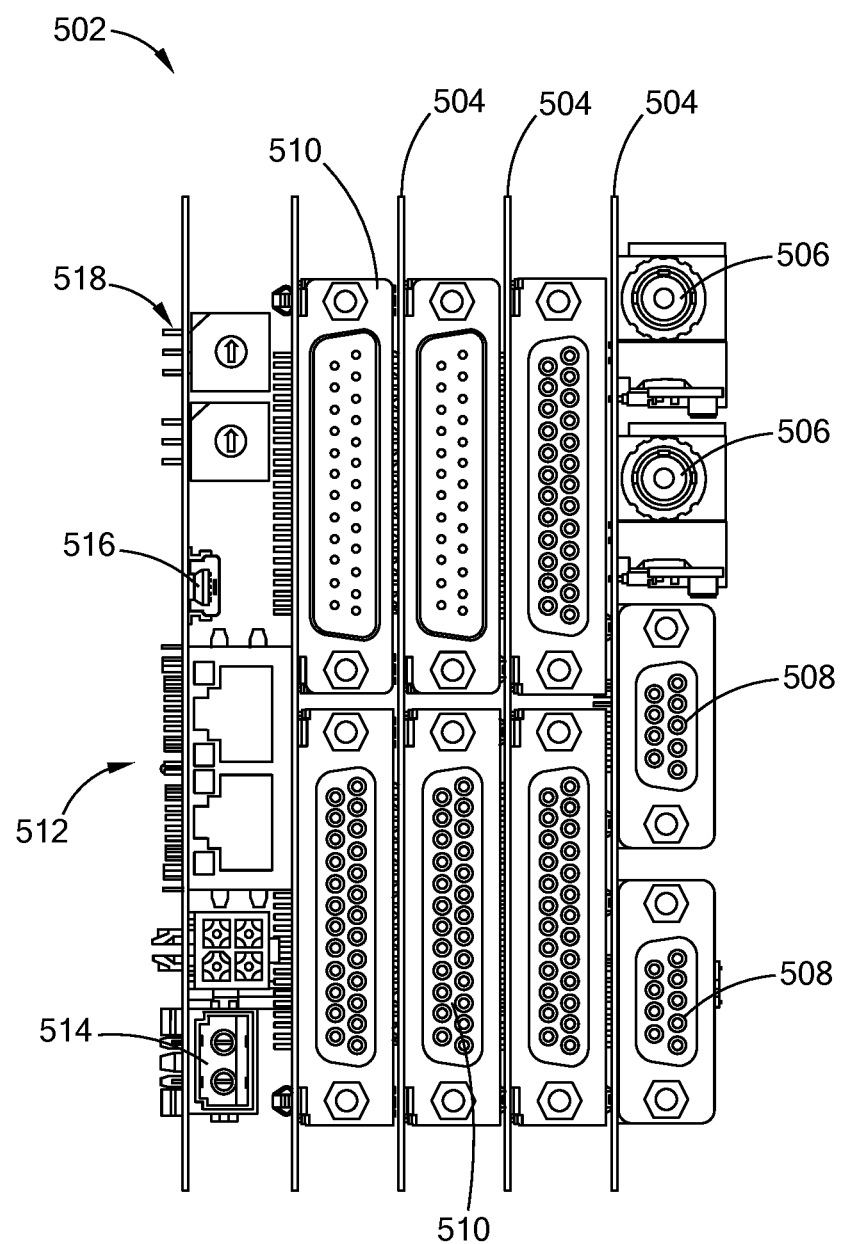
FIG. 5 is a front view of a process controller with integrated controls for optical sensors having open board construction constructed in accordance with the teachings of the present disclosure.

Referring to FIG. 5, a front view of a process controller 502 with integrated optical sensing having open board construction is shown in accordance with another form of the present disclosure. In this implementation, the process controller 502 comprises open board construction 504 having no enclosure. The process controller 502 may be implemented with various options depending on the processes or systems being controlled. Similar to the implementation introduced in FIG. 5, the process controller comprises a plurality of optical sensors 506 integrated into the process controller. In this implementation, the optical sensors 506 may be applied to communicate through fiber optic cable to measure the temperature of two temperature zones.

The process controller 502 may further comprise a plurality of communications (I/O) ports including serial communication ports 508, a plurality of parallel ports 510, an Ethernet port 512, and a USB port 514. In this implementation, the process controller further comprises a Micro-USB port 516 and device address dials 518 to identify communication channels among one or more devices of the controlled system. The I/O ports may also be applied to communicate instructions from the process controller 402 to a plurality of controlled devices or systems similar to the process controller 402 introduced in FIG. 4.

Figure 6:
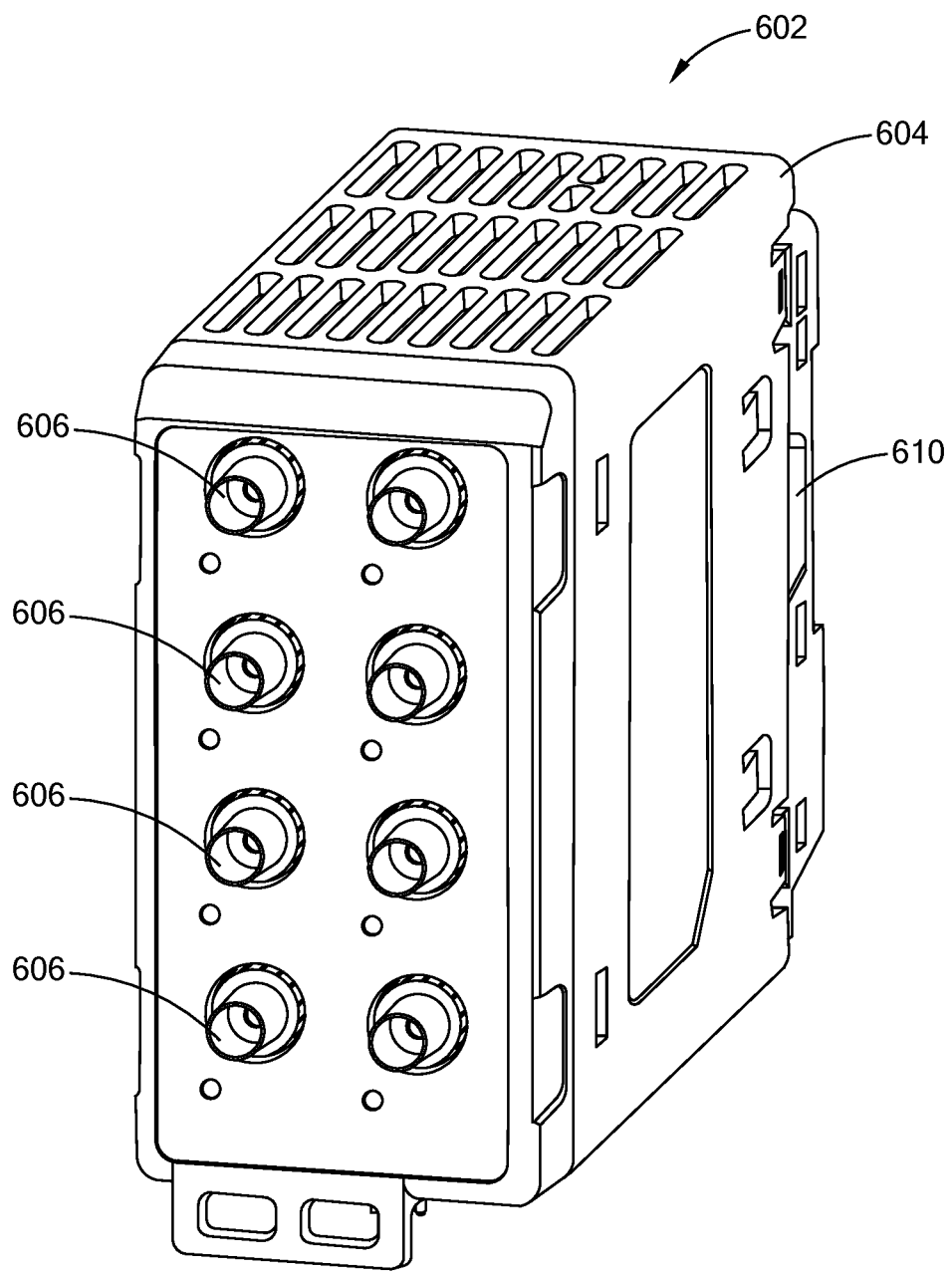
FIG. 6 is a perspective view of another implementation of an enclosed process controller with integrated optical sensing constructed in accordance with the teachings of the present disclosure.

Referring to FIG. 6, another form of an enclosed process controller 602 with integrated optical sensing is illustrated and generally indicated by reference numeral 602. Similar to the implementation in FIG. 4 above, the controller 602 includes a mechanical enclosure 604 housing one or more printed circuit cards with electronic components for temperature sensing and heater operation controls, and communication I/O modules or circuitry for communication with other electronic entities within the controlled system. The process controller 602 comprises a plurality of optical sensors 606 integrated into the process controller. In addition, the process controller may further comprise of various communication (I/O) ports, as previously discussed, including by way of example a parallel port 610.

Figure 7:
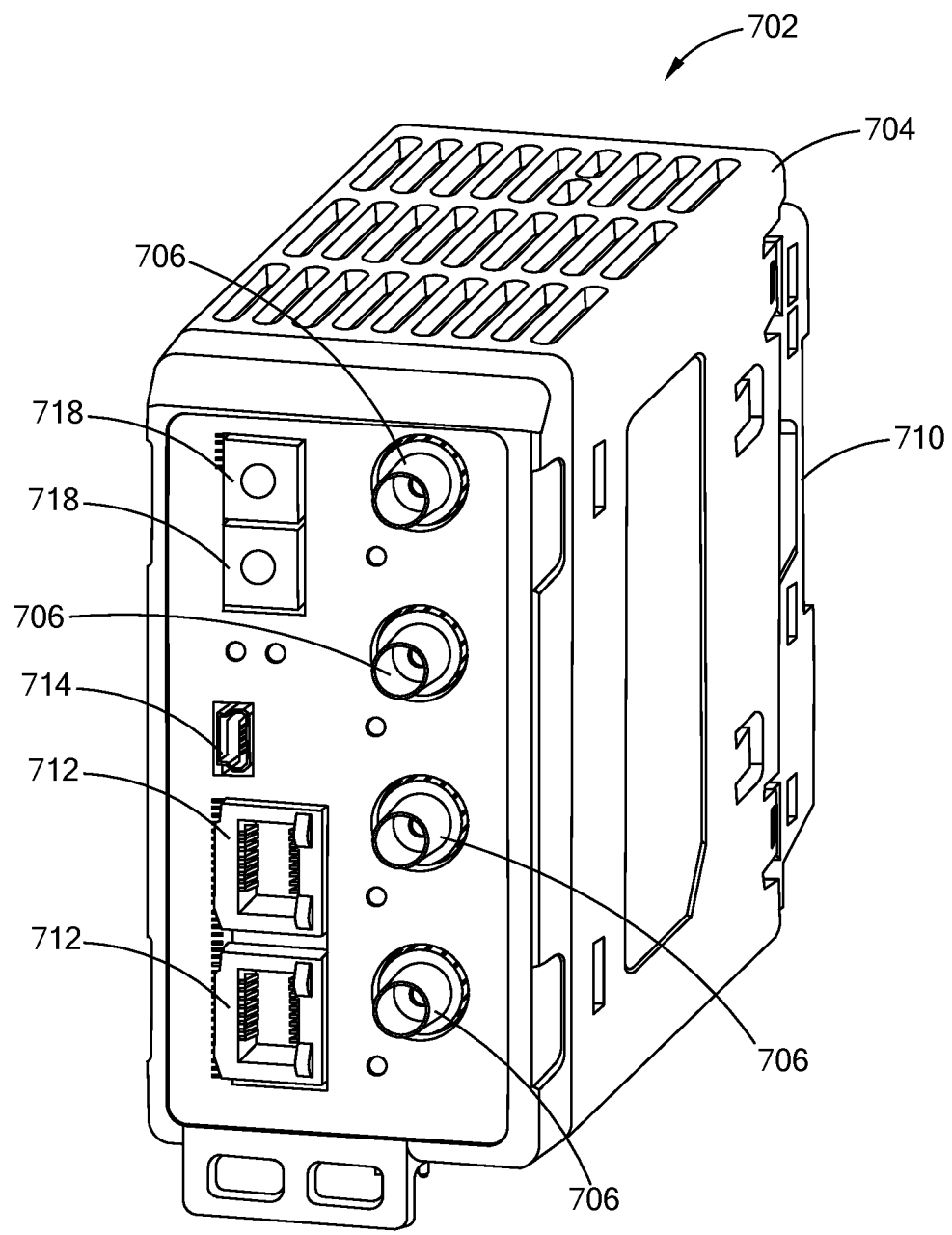
FIG. 7 is a perspective view of yet another form of an enclosed process controller with integrated optical sensing constructed in accordance with the teachings of the present disclosure.

Yet another form is shown in FIG. 7, which is an enclosed process controller 702 with integrated optical sensing. Similar to the implementation in FIG. 5 above, the controller 702 includes a mechanical enclosure 704 housing one or more printed circuit cards with electronic components for temperature sensing and heater operation controls, and communication I/O modules or circuitry for communication with other electronic entities within the controlled system. (It should be understood that temperature sensing and heater control are merely exemplary and should not be understood as limiting the scope of the present disclosure). The process controller 702 comprises a plurality of integrated optical sensors 706. In addition, the process controller 702 may further comprise various communication (I/O) ports, including by way of example, a parallel port 710, an Ethernet port 712 and a USB port 714. The process controller may further include device address dials 718 to identify communication channels among one or more devices of the controlled system. The I/O ports may also be applied to communicate instructions from the process controller 702 to a plurality of control devices or systems, similar to the process controller 402 as shown in FIG. 4.

It is noted that the various modules and/or circuitries (e.g., controller, microcontroller, processors, etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory (ROM), random access memory (RAM), volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions may be embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A system comprising:
   at least one optical probe; and
   a processor controller comprising:
      at least one optical sensor integrated in the process controller, the at least one optical sensor being communicably coupled to the at least one optical probe, wherein the at least one optical sensor includes an optical source, an optical detector, and a cable interface, wherein the cable interface is configured to connect to a fiber-optic cable and couples the at least one optical probe to the at least one optical sensor by way of the fiber-optic cable, wherein the optical source emits light toward the at least one optical probe via the cable interface and the fiber-optical cable, and the optical detector receives a return light profile from the at least one optical probe via the cable interface and the fiber-optic cable, and the optical detector outputs an electronic signal based on the return light profile, and
      a control unit in communication with the at least one optical sensor, wherein the control unit measures and stores a condition of an object based on the electronic signal and controls a controlled device based on the measured condition.

2. The system according to claim 1, wherein the control unit interprets the electronic signal to measure a temperature of one or more temperature related processes and controls the controlled device based on the measured temperature.

3. The system according to claim 1, wherein the electronic signal is indicative of a temperature of the object.

4. The system according to claim 1 further comprising a communication port, wherein the control unit is communicably coupled to the controlled device by way of the communication port.

5. The system according to claim 1 further comprising a housing wherein the optical sensor and the control unit are housed in the housing.

6. A system comprising:
   at least one optical probe; and
   a process controller comprising:
      at least one optical sensor integrated in the process controller, the at least one optical sensor being communicably coupled to the at least one optical probe, wherein the at least one optical sensor includes an optical source and an optical detector, the optical source emits light toward the optical probe and the optical detector receives a return light profile from the optical probe, wherein the at least one optical sensor further includes a cable interface configured to connect to a fiber-optic cable, wherein the cable interface couples the at least one optical probe and the at least one optical sensor by way of the fiber-optic cable; and
      a control unit arranged with and in communication with the at least one optical sensor, wherein the control unit measures and stores a condition of an object based on the return light profile and controls a controlled device based on the measured condition.

7. The system according to claim 6, wherein the condition is at least one of temperature, pressure, strain, gas concentrations, and corrosion.

8. The system according to claim 6, wherein the at least one optical sensor is selected from the group consisting of pressure, strain, gas concentration, and corrosion.

9. The system according to claim 6 further comprising a plurality of communication ports, wherein the control unit is communicably coupled to the controlled device by way of the plurality of communication ports.

10. The system according to claim 6, wherein the at least one optical sensor is an optical temperature sensor.

11. The system according to claim 6, wherein the control unit measures a temperature of the object, as the condition of the object, based on the return light profile.

12. A system for process control in an elevated radio frequency (RF) environment, the system comprising:
   at least one optical probe; and
   a process controller comprising at least one optical sensor integrated in the process controller, a control unit in communication with the at least one optical sensor, and a housing, wherein:
      the at least one optical sensor is communicably coupled to the at least one optical probe, the at least one optical sensor includes an optical source and an optical detector, the optical source emits light toward the at least one optical probe and the optical detector receives a return light profile from the at least one optical probe and outputs an electronic signal based on the return light profile, wherein the at least one optical sensor further includes a cable interface configured to connect to a fiber-optic cable, wherein the cable interface couples the at least one optical probe and the at least one optical sensor by way of the fiber-optic cable;

the control unit interprets the return light profile to measure and store a condition of an object and controls a controlled device based on the measured condition, and the housing houses the optical sensor and the control unit.

13. The system according to claim 12 further comprising a reporting server, wherein the process controller is in communication with the reporting server and transmits data indicative of performance of the controlled device to the reporting server.

14. The system according to claim 12, wherein the control unit of the process controller measures a temperature of the object, as the condition, based on the return light profile.

15. The system according to claim 12, wherein the process controller further includes a plurality of communication ports, and further wherein the control unit is communicably coupled to the controlled device by way of the plurality of communication ports.

16. The system according to claim 12, wherein the at least one optical sensor is an optical temperature sensor.

* * * * *